United States Patent [19]

Kempner et al.

[11] Patent Number: 5,221,713

[45] Date of Patent: Jun. 22, 1993

[54] CO-MICROAGGLOMERATION OF EMULSION POLYMERS (ENCAPSULATED CORE/SHELL ADDITIVES FOR PVC)

[75] Inventors: James S. Kempner, Southampton; Hsing-Yeh Parker, Holland; Janis C. Stevenson, Langhorne, all of Pa.; Morris C. Wills, Roebling, N.J.; Judith L. Allison, Medford, both of N.J.

[73] Assignee: Rohm and Haas Company, Philadelphia, Pa.

[21] Appl. No.: 772,406

[22] Filed: Oct. 7, 1991

[51] Int. Cl.[5] .................. C08L 51/04; C08L 27/06
[52] U.S. Cl. ........................ 525/71; 525/902
[58] Field of Search .................. 525/71, 902

[56] References Cited

U.S. PATENT DOCUMENTS

| | | | |
|---|---|---|---|
| 3,041,289 | 6/1962 | Katchen et al. | 426/415 |
| 3,111,407 | 11/1963 | Lindquist et al. | 430/138 |
| 3,251,904 | 5/1966 | Souder et al. | 260/876 |
| 3,803,267 | 4/1974 | Kuwahara et al. | 260/890 |
| 3,859,384 | 1/1975 | Carty et al. | 260/876 |
| 3,859,389 | 1/1975 | Carty et al. | 260/885 |
| 3,867,481 | 2/1975 | Whang | 260/899 |
| 4,120,833 | 6/1976 | Purvis et al. | 921/81 |
| 4,141,932 | 2/1979 | Butler | 260/880 |
| 4,387,138 | 6/1983 | Gift | 428/407 |
| 4,398,019 | 8/1983 | Cox et al. | 528/183 |
| 4,419,482 | 12/1983 | Teyssie et al. | 525/560 |
| 4,419,496 | 12/1983 | Henton | 525/301 |
| 4,426,493 | 1/1984 | Falk | 525/239 |
| 4,468,499 | 8/1984 | Siegfried et al. | 525/301 |
| 4,513,111 | 4/1985 | Kishida et al. | 524/458 |
| 4,654,400 | 3/1987 | Lohmeijer et al. | 525/64 |
| 4,699,948 | 10/1987 | Kismida et al. | 525/85 |
| 4,956,129 | 9/1990 | Scher et al. | 264/4.7 |

FOREIGN PATENT DOCUMENTS

217397A2 10/1986 European Pat. Off. .
252383A1 12/1987 German Democratic Rep. .
3037255A 2/1991 Japan .

OTHER PUBLICATIONS

R. D. Deanin et al. "Polyblends of an Ionomer with Nine Different Thermoplastics", in Polymeric Materials Science and Engineering, vol. 53 (1985), pp. 813-817.

Danneels, D. F., "Low Molecular Weight Ionomers as Processing Aids and Additives", in First European Conference on High Performance Additives, London, May 10-11, 1988.

C. I. Chung et al., "A Solid Solvent as Processing Aid for Polystyrene," pp. 1339-1349 in J. Applied Polymer Sceince Vo. 37 (1989).

Primary Examiner—James J. Seidleck
Assistant Examiner—Patrick R. Delaney
Attorney, Agent, or Firm—Roger K. Graham

[57] ABSTRACT

Core/shell additives, useful in modifying the processing and/or physical properties of poly(vinyl chloride) and other thermoplastic matrix polymers, are prepared separately at small particle sizes by emulsion polymerization, co-agglomerated, further encapsulated by a final shell, and isolated by spray-drying or coagulation. The isolated powders are readily re-dispersed to their original particle sizes in the matrix polymer.

12 Claims, No Drawings

CO-MICROAGGLOMERATION OF EMULSION POLYMERS (ENCAPSULATED CORE/SHELL ADDITIVES FOR PVC)

FIELD OF THE INVENTION

This invention relates to a process for preparing certain core/shell polymeric additives of small core particle size, to the core/shell additives so prepared, and to their blends with a variety of matrix thermoplastics.

This invention relates to co-encapsulated mixtures of core/shell polymeric additives of small core particle size, to a process for preparing such core/shell additives, and to their blends with a variety of matrix thermoplastics.

BACKGROUND OF THE INVENTION

Processing poly(vinyl chloride) into useful objects requires a variety of adjuvants such as thermal stabilizers, processing aids, lubricants, optionally impact modifiers, pigments, and the like. In recent years, polymeric additives have been developed for many of these purposes, such as impact modification by core/shell polymers based on a butadiene or poly(alkyl acrylate) core surrounded by shells containing alkyl(meth)acrylate or vinyl aromatic polymers. Also, processing aids based on high molecular polymers of alkyl methacrylates are well-known. Such processing aids aid in the conversion of the PVC particles under conditions of heat and shear to a molten plastic capable of being shaped into the final desired object, the processing aids improving the fusion behavior and the processing of the melt. Further, special lubricating/processing aids based on polymers of alkyl (meth)acrylates have been developed which aid in fluxing and release from hot metal surfaces, further contributing relatively small increases to the melt viscosity of the PVC compound, which is important for certain processing operations, such as injection molding.

The producers of such polymeric additives have continued to seek for means of combining such additives beyond simple blending, so as to obtain an unexpected improvement in properties. One means has been to form core/shell polymers wherein, for example, a lubricating polymer is encapsulated by a processing aid polymer. Such encapsulation is best accomplished by sequential emulsion polymerization under conditions where the second polymer is prepared at conditions where no new particles are formed, and all the new polymer is formed at the pre-formed sites offered by the first polymer particles.

Simple blending of such core/shell emulsions prior to isolation, such as by coagulation or spray-drying, can create certain problems. Particles with low content of shell polymer may compact and not flow freely, or the lubricating component may deleteriously effect the fusion process, or dispersion of the additive polymers, either to their initial particle size in the PVC matrix or to miscible blends with the PVC, may be adversely affected.

Thus the compounder of poly(vinyl chloride) has sought a means for improving the efficacy of mixtures of polymeric additives, and the manufacturer has sought means to combine such more efficiently and to produce blends which handle well without compaction prior to admixture with the PVC.

SUMMARY OF THE INVENTION

We have found a blend of polymeric additives which comprises a core/shell impact modifier having a core based on a polybutadiene or polyacrylate rubber and an intermediate shell of a harder polymer, i.e., one having a glass temperature above $-20°$ C. and formed mainly, i.e., from at least 50 weight percent, from $C_1$ to $C_4$ esters of (meth)acrylic acid, in combination with a processing aid component having a core formed mainly from $C_4$ to $C_{12}$ esters of (meth)acrylic acid, optionally a second intermediate shell of polymer derived mainly from vinyl aromatic or $C_1$ to $C_4$ alkyl esters of (meth)acrylic acid and low levels of a multifunctional crosslinking monomer or an unsaturated acid partially or completely neutralized, and/or optionally with a third intermediate shell stage comprised mainly of polymers of vinyl aromatic or $C_1$ to $C_4$ esters of (meth)acrylic acid, the two core-shell polymers being agglomerated together and then further encapsulated with a final shell of a polymer predominantly formed from a $C_1$ to $C_4$ ester of (meth)acrylic acid. By processing aid component is meant a polymer which aids in the processing of a matrix polymer, such as by controlling the fusion process, increasing or reducing the melt viscosity of the molten matrix polymer, preventing sticking to hot metal surfaces, increasing the melt strength, improving surface appearance, and the like. We further have discovered a process for preparing such an agglomerated, encapsulated blend, and a blend with a thermoplastic matrix polymer, such as PVC, of such a blend.

DETAILED DESCRIPTION OF THE INVENTION

Most specifically, our invention comprises an agglomerated, encapsulated blend of a core/shell impact modifier and a core/shell processing aid which comprises:

a) an impact modifier component comprising particles of:
  1) a rubbery core polymer particle having a glass temperature below about $-20°$ C. and a particle size below about 100 nm diameter, the rubbery core polymer particle being formed from at least 50 weight percent of units derived from butadiene, $C_2$ to $C_8$ lower alkyl esters of acrylic acid, or mixtures thereof, and having a weight-average molecular weight of at least about 500,000;
  2) a rubbery intermediate shell polymer encapsulating the rubber core polymer, the shell polymer having a glass temperature above $-20°$ C., the intermediate shell being formed predominantly from units derived from $C_1$ to $C_4$ esters of acrylic or methacrylic acid, and the intermediate shell being from about 5% to about 20% by weight of the rubbery core/intermediate shell polymer particles;
b) a processing aid component comprising particles of:
  1) a core polymer particle having a particle size below about 100 nm diameter, the core polymer particle being formed from at least 80 weight percent of units derived from $C_4$ to $C_{12}$ alkyl esters of acrylic acid or methacrylic acid or mixtures thereof and from 0 to about 20 parts of units derived from at least one other vinyl or vinylidene monomer, and having a weight-average molecular weight of no more than about 100,000, the core polymer not containing units derived from a graftlinking or crosslinking monomer, and the core polymer not being deliberately crosslinked; and at least one of:

2) an intermediate crosslinked shell polymer encapsulating the core polymer, and containing
   a) at least about 90 weight percent of units derived from one of more of vinyl aromatic monomers, such as styrene, or $C_1$-$C_4$ alkyl esters of (meth)acrylic acid, such as methyl methacrylate or butyl acrylate,
   b) from about 0.5 to about 10 weight percent of units derived from at least one of:
      i) a multifunctional monomer containing two or more copolymerizable double bonds;
      ii) an alkali, alkaline earth, or transition metal salt of a copolymerizable unsaturated acid, and optionally units derived from the copolymerizable unsaturated acid; or 3) a third intermediate shell stage of a polymer encapsulating the core polymer particle and, if present, the intermediate cross-linked shell polymer, and containing at least about 70 weight percent of units derived from one or more of vinyl aromatic monomers or $C_1$-$C_4$ alkyl esters of methacrylic acid;

c) an encapsulating shell of hard polymer having a glass temperature of at least 60° C., the encapsulating shell being formed predominantly from units derived from a $C_1$ to $C_4$ alkyl ester of methacrylic acid, the encapsulating shell comprising from 5 to about 20% by weight of the final core/shell polymer blend, the encapsulating shell encapsulating an agglomerate of impact modifier and processing aid particles, the encapsulating shell forming a particle of at least 150 nm diameter.

In the above description the processing aid component must contain at least one of the two optional intermediate shells. If both are present, then the formation of the second intermediate shell must precede the formation of the third intermediate shell.

The presence of the second optional shell may add to the impact strength of the resulting blend, especially when comprised of units derived from esters of acrylic acid.

The blend may further contain at least one of an antioxidant or a thermal stabilizer, such as those needed to stabilize the blend during isolation by coagulation and spray-drying, or during the processing of the blend with a thermoplastic matrix resin. Such stabilizers may include antioxidants such as hindered phenols, thermal stabilizers such as disulfides, mercaptoesters, and the like, or organic phosphites, such as trisarylphosphites and the like.

For best compatibility with many thermoplastic matrix resins, such as PVC, it is preferred that at least one of the encapsulating shell of the final core/shell polymer blend, the first intermediate shell polymer, or the third intermediate shell stage of the second core/shell polymer comprises a majority of units derived from methyl methacrylate. Thus, these shells may contain a homopolymer of methyl methacrylate, or copolymers of methyl methacrylate with up to about 50%, preferably up to about 20%, of at least one co-monomer such as ethyl acrylate, butyl acrylate, butyl methacrylate, styrene, acrylonitrile, and the like.

In the rubbery core of the impact modifier component, for ease of preparation, especially by emulsion polymerization, it is preferred that the core be predominantly at least one of butadiene or of butyl acrylate. Especially preferred, for reasons of producing weatherable impact modifiers, is a homopolymer of butyl acrylate.

For best impact properties, it is preferred that the rubbery first core polymer, especially if formed from an acrylate monomer such as butyl acrylate or 2-ethylhexyl acrylate, further contains units derived from at least one multiunsaturated monomer, such as at least one of allyl methacrylate, allyl acrylate, diallyl maleate, diallyl fumarate divinylbenzene, a di- or triacrylate ester of a polyol, or a di- or trimethacrylate ester of a polyol, and the like.

The first core/shell impact modifier may contain additional shells between core and first intermediate shell or external to the first intermediate shell, such as polymers of styrene for improvement of refractive index, as long as the other requirements of the first core/shell polymer are met.

In the processing aid portion of the blend, for reasons of cost and efficacy it is preferred that the $C_4$ to $C_{12}$ alkyl ester of acrylic acid or methacrylic acid in the second core polymer particle is butyl acrylate. Such core polymers can include homopolymers of butyl acrylate, copolymers of butyl acrylate with other acrylates, such as ethyl acrylate, 2-ethylhexyl acrylate and the like, copolymers with monomers of higher refractive index, such as styrene and the like, copolymers with acrylonitrile and the like. The second core polymer may be effectively reduced in molecular weight by use of chain transfer agents, such as alkyl mercaptans.

The second stage of the processing aid may be formed from homo- or copolymers of monomers such as styrene, methyl methacrylate, butyl acrylate, ethyl acrylate, and the like. This stage is either crosslinked by the presence of a multifunctional monomer containing two or more double bonds, such as from about 0.1 to about 5% of at least one of allyl methacrylate, allyl acrylate, diallyl maleate, diallyl fumarate, divinylbenzene, a di- or triacrylate ester of a polyol, or a di- or trimethacrylate ester of a polyol.

Alternatively or concurrently, the second stage of the processing aid may be crosslinked by ionic groups, which crosslinking may be thermally reversible. Such may be accomplished by use of an unsaturated acid, preferably one of methacrylic acid, acrylic acid, itaconic acid, maleic acid, fumaric acid, alpha-methylene-delta-methyladipic acid, or acryloxypropionic acid. The salt may be alkali, such as sodium, potassium, and the like, alkaline earth, such as calcium and the like, or transition metal, such as zinc and the like. Preferred is the sodium salt. Neutralization may be partial or complete.

Our invention further contemplates a toughened blend of the blend of first core/shell impact modifier and second core/shell processing aid described above with a thermoplastic matrix resin. More specifically, after isolation, the impact modifier/processing aid additive may be mixed with the appropriate matrix polymer at levels to obtain improvement in impact, which will generally be from about 3 to about 40 percent by weight of the toughened blend. The thermoplastic resin or matrix or polymer of the toughened blend may be one or more of many well-known thermoplastics known to accept impact modification from core/shell modifiers. The thermoplastic resin may be a homopolymer of vinyl chloride, a copolymer containing at least 80 weight percent of units derived from vinyl chloride, such as a vinyl chloride-vinyl acetate copolymer, a homopolymer of methyl methacrylate or a copolymer containing at least 80 weight percent of units derived from methyl methacrylate, such as a methyl methacrylate/ethyl acrylate or a methyl methacrylate/styrene copolymer. The thermoplastic resin may be an engineering resin, such as a polyester of terephthalic acid and an aliphatic glycol, a polyamide, a polycarbonate, a polyglutarimide, an acrylonitrile-butadiene-styrene resin, or a blend of at least two of such resins.

Because of the thinness of the final encapsulating shell and because it is often selected to be readily dispersible in the matrix polymer, on processing with heat and shear, the co-agglomerated polymer will usually be dispersed into domains of particle size equivalent to those of the particles of the non-agglomerated core/intermediate shell polymers. This dispersion behavior is advantageous for improvement of optical properties of the blend as well as allowing the specific property advantages contributed by the various components, such as lubrication, improved flow, impact strength, and the like, to be realized after the blend is fused. In the presence of the processing aid component of the impact modifier/processing aid blend, processing of the matrix polymer is improved. For PVC, certain processing additives, such as those based on a core of low molecular weight polymers of butyl acrylate, will aid in release of the PVC from hot metal surfaces aid in reducing the melt viscosity of the blend towards improved injection molding.

The toughened blend may further contain one or more of lubricant, processing aid, rheology modifier, dye, pigment, flame retardant, thermal stabilizer, antioxidant, antiozonant, ultraviolet stabilizer, mold release agent, reinforcing filler or non-reinforcing filler. The reinforcing filler may be least one of glass fibers, glass spheres, talc, or mica.

In the case of poly(vinyl chloride), the blend may also contain a heat distortion improver, such as a polyglutarimide. The impact modifier may be used in PVC with conventional stabilizers which may be selected depending on the degree of stability, color retention, lubricity, and weatherability required, such as organotin, organic lead, barium-cadmium, and calcium-zinc stabilizers.

The PVC blends containing the impact modifiers of the present invention may be used for production of extruded, injection molded, blow-molded and foamed articles of commerce, such as siding, especially for architectural uses, window shades, protective shading, window profiles, pipe and drainage uses, appliance housings, refrigerator liners and trays, bottles for packaging of liquids and solids, such as potable water, food oils, and the like, and for many other conventional uses.

The blends with engineering resins, such as a polyester of terephthalic acid and an aliphatic glycol, a polyamide, a polycarbonate, a polyglutarimide, an acrylonitrile-butadiene-styrene resin, or a blend of at least two of such resins, may be used for many applications where the engineering resin is already employed, but where further toughness is required, such as appliance housings, automotive parts, food packaging, such as trays, bottles, and the like, toys, furniture, and other well-known uses.

Blends with methyl methacrylate may be employed to give additional toughness to uses such as capstock, translucent or transparent glazing, molded articles, such as cups, taillights, and the like.

The invention further encompasses the novel process for preparing a blend of a first core/shell impact modifier and a second core/shell processing aid which comprises:

a) forming by emulsion polymerization a rubbery first core polymer particle having a glass temperature below about $-20°$ C. and a particle size below about 100 nm diameter, the first core polymer particle being formed from at least 50 weight percent of units derived from butadiene, $C_2$ to $C_8$ alkyl esters of acrylic acid, or mixtures thereof, and having a weight-average molecular weight of at least about 500,000;

b) forming by sequential emulsion polymerization in the presence of the first core polymer, under conditions wherein essentially no new polymer particles are formed, a first intermediate shell polymer having a glass temperature above $-20°$ C., the first intermediate shell being formed predominantly from units derived from $C_1$ to $C_4$ esters of acrylic or methacrylic acid, and the first intermediate shell being from about 5% to about 20% by weight of the first core/intermediate shell polymer particles;

c) separately forming by emulsion polymerization a second core polymer particle having a particle size below about 100 nm diameter, the second core polymer particle being formed from at least 80 weight percent of units derived from $C_4$ to $C_{12}$ alkyl esters of acrylic acid or methacrylic acid or mixtures thereof and from 0 to about 20 parts of units derived from at least one other vinyl or vinylidene monomer, and having a weight-average molecular weight of no more than about 100,000, the second core polymer not containing units derived from a graftlinking or crosslinking monomer, and the second core polymer not being deliberately crosslinked;

d) optionally forming by sequential emulsion polymerization in the presence of the second core polymer, under conditions wherein essentially no new polymer particles are formed, a second intermediate crosslinked shell polymer containing
  1) at least about 90 weight percent of units derived from one or more of vinyl aromatic monomers or $C_1$ to $C_4$ alkyl esters of (meth)acrylic acid,
  2) from about 0.5 to about 10 weight percent of units derived from at least one of:
    a) a multifunctional monomer containing two or more copolymerizable double bonds;
    b) a copolymerizable unsaturated acid, the copolymerizable unsaturated acid being partially to completely in the form of an alkali, alkaline earth, or transition metal salt;

e) optionally forming by sequential emulsion polymerization in the presence of the second core/intermediate crosslinked shell polymer, under conditions wherein essentially no new polymer particles are formed, a third intermediate shell stage of a polymer containing at least about 70 weight percent of units derived from one or more of vinyl aromatic monomers or $C_1$ to $C_4$ alkyl esters of methacrylic acid, wherein at least one steps (d) or (e) must be conducted;

f) admixing the polymer particles formed in steps (a-b) and in steps (c-e) in emulsion form;

g) agglomerating the core/intermediate shell polymer particles to form a dispersion of agglomerated particles of at least 150 nm diameter;

h) forming by sequential emulsion polymerization onto the agglomerated particles, under conditions wherein essentially no new polymer particles are formed, an encapsulating shell of hard polymer having a glass temperature at least 60° C., the encapsulating shell being formed predominantly from units derived from a $C_1$ to $C_4$ alkyl ester of methacrylic acid, the encapsulating shell comprising from about 5 to about 20% by weight of the final core/shell polymer blend; and i) isolating the final core/shell polymer blend.

The conditions by which the various polymerizations are run are generally known to the art of core/shell emulsion polymerization. The initiators are those common to emulsion polymerization, such as persulfates, peresters, hydroperoxides, peracids, azo compounds, and the like, and some or all of the initiators may be combined with activators to form "redox" pairs. Such activators include sodium formaldehyde sulfoxylate, sodium metabisulfite, sodium hydrosulfite, and the like.

Surfactants may be chosen from a variety known to the emulsion art, such as alkali metal or ammonium salts of long-chain alkylsulfonic acids, long-chain alkylsulfates, derivatives of aromatic sulfonates, ethoxylated alkaryl phosphates, and the like. To accomplish the microagglomeration, it appears necessary that the emulsifier be the alkali metal or tetrasubstituted ammonium salt of a strong acid, and that emulsifiers based on weak acids, such as salts of fatty acids, are less effective. Preferred are sulfates and sulfonates, such as sodium lauryl sulfate, sodium dodecylbenzene sulfonate, potassium dodecylbenzene sulfonate, lauryl(ethoxy)sulfates and sulfonates, lauryl(polyethoxy)sulfates and sulfonates, alkaryl(polyethoxy)sulfates and sulfonates, and the like. It further appears that the microagglomeration is most effective when the particle size of the starting polymers are below about 100 nm.

The microagglomerations may be conducted by addition of appropriate coagulants in limited amounts so as to bring the particles together without a total precipitation from the latex. Such can be accomplished by careful addition of salts such as sodium chloride, calcium chloride, and the like, or if the emulsion is stabilized with a soap with carboxylic acid groups, by addition of an appropriate acid. An effective means is to add separate streams of a weak acid and a weak base with rapid stirring so that the salt is formed in situ in a diluted form. The weak acid and weak base may be added as concentrated solutions, so the emulsion is diluted very little during the agglomeration step.

The weak acid and weak base should be water-soluble, and it is preferred that their salt be also. Suitable weak bases are ammonia, low molecular weight amines such as monomethyl amine, and the like. Ammonia is preferred. Suitable weak acids are carbon dioxide, sulfur dioxide, acetic acid, formic acid, propionic acid, and the like. Acetic acid is preferred.

On agglomerating the mixed latices latex of first core/intermediate shell polymer particles to form a latex of co-agglomerated particles of at least 150 nm diameter, the solids content of the latex of first core/intermediate shell polymer particles should be no higher than about 40 percent, and if the addition method utilizing separate streams of a weak acid and a weak base be utilized, no higher than about 30%, and the solids content of the latex of agglomerated particles should be no higher than about 30%. Otherwise the mixtures become so viscous that stirring can be disturbed and effective agglomeration cannot occur.

The impact modifier/processing aid further comprises a final encapsulating shell of hard polymer of glass temperature at least 60° C., the final encapsulating shell being formed predominantly from units derived from methyl methacrylate, the final encapsulating shell comprising from about 5 to about 20% by weight of the core/shell impact modifier, the final encapsulating shell encapsulating more than one core/intermediate shell particles, and the final encapsulating shell forming a particle of at least 150 nm diameter. The encapsulation process again is conducted under conditions where the amount of free encapsulating polymer is minimized, that is, with no additional soap and under conditions known to the art for encapsulation in conventional core/shell modifiers. Thus the final encapsulating shell may be a homopolymer of methyl methacrylate, a copolymer of methyl methacrylate with a small amount of an alkyl acrylate or an alkyl methacrylate, such as ethyl methacrylate or butyl acrylate, a copolymer of methyl methacrylate with styrene, a copolymer of methyl methacrylate with methacrylic acid, and the like, as long as the methyl methacrylate is greater than 50% by weight of the intermediate shell polymer. The final encapsulating shell polymer may be partially or totally attached to or grafted to the core polymers, but it is preferred that it not be highly grafted or attached. It is further preferred that the molecular weight of the final encapsulating polymer be of relatively high molecular weight, such as above about 100,000. Molecular weights which are very high, such as about 1,000,000 and above, of the final encapsulating polymer are difficult to obtain without attachment or grafting to the core or intermediate shell. Nevertheless, certain compositions having a quite high molecular weight of the final encapsulating shell may be useful for certain applications. The low level of final encapsulating shell polymer is chosen so as to dilute the rubber and processing aid component content as little as possible whilst still allowing isolation of the impact modifier with acceptable isolation rates and flow properties.

The total rubber (first core polymer) and second core polymer content of the modifier after final encapsulation preferably should be no more than about 86%, or effective redispersion is more difficult to accomplish, which would lead, e.g., to a blend of modifier with PVC of poorer light transmission. This means that the total of all shell polymers should preferably be at least about 14 weight percent of the total core/shell polymer.

The most unusual attribute of the new modifier is that the final shell encapsulates more than one particle. After the initial smaller particles are agglomerated, the final shell then can encompass several original particles within one shell. It is preferred that the final shell encapsulate at least ten of the original particles. The number of original particles encapsulated can be calculated from the geometry relationships of the initial core/intermediate shell particle, in that the volume of the final core/shell polymer will be approximately $(D_a/D_p)\exp+3$ that of the core/intermediate shell particle, where $D_a$ and $D_p$ are the measured diameters of the core/intermediate shell particle and of the agglomerated core/intermediate shell/final shell particle, respectively.

The polymeric additive may be isolated from emulsion by any of several well-known means. It may be admixed with hot matrix polymer on a mill or in an intensive mixer whilst still in emulsion form and the water flashed off. It is preferred it be separately isolated by conventional means, such as spray-drying, freeze-coagulation, salt-coagulation, such as by addition of an aqueous solution of a salt of an inorganic acid, such as sodium chloride, magnesium acetate, calcium hypophosphite, and the like, methanol-coagulation, and the like, and then dried. It is preferred not to dry the polymeric additive at temperatures which may fuse the modifier and delay redispersion, such as by pelletization by means of an extruder, although such methods may be used if conditions which avoid fusion are chosen. In addition to the specific embodiments of this invention illustrated below, we contemplate equivalents of the blends of this invention wherein in addition to the specific units taught, additional units may be present which do not adversely affect the utility and properties of this invention. Such equivalent blends can be prepared in a conventional manner, e.g., by substituting in addition a corresponding monomer bearing a different or additional substituent as starting material in the reactions described in the following preparative Examples.

EXAMPLE 1

Microagglomerated Acrylic Impact Modifier Latex Polymer

A. Small Particle Size Acrylic Impact Modifier

1. First core/first intermediate shell

In a 5-liter round bottom flask, 1179 grams deionized water was heated to 55° C. with nitrogen sparge. At 55° C., the nitrogen sparge is changed to a constant sweep. Then the following solutions are added to the flask: 17.52 grams of a 0.125 weight % sodium p-nitrosophenolate solution with 7.47 grams deionized rinse water, 15.22 grams of 1.44 weight % tartaric acid solution with 3.46 grams rinse water and 36.18 grams of 25 weight % sodium lauryl sulfate solution with 29.5 grams of rinse water. A separated emulsified monomer mixture is prepared containing 280.7 grams water, 7.62 grams 25% sodium lauryl sulfate solution, 1087.4 grams n-butyl acrylate and 7.68 grams allyl methacrylate. This emulsified monomer mixture is polymerized in 4 separate shots. The first shot contains 153.7 grams of this monomer emulsion mixture. After it is added to the flask, 0.20 grams 70% t-butyl hydroperoxide and 1.1 grams sodium sulfoxylate formaldehyde dissolved in 17.35 grams of water are immediately added to the flask. Five grams of water are used to rinse the container for sodium sulfoxylate formaldehyde and 104 grams of water is used to rinse the container for the monomer emulsion. After the exotherm has reached its peak temperature, the reaction mixture is held at this peak temperature for 15 minutes and then cooled to 53° C. The second shot of monomer emulsion, 127.45 grams, is now added into the flask followed by another addition of 0.15 grams of the 70% t-butyl hydroperoxide solution. After the exotherm, the mixture is held at the peak temperature for 15 minutes and then cooled to 53° C. The third charge of monomer emulsion is 573.6 grams of the total monomer mixture. The third addition of the initiator is 0.70 grams of the 70% t-butyl hydroperoxide. The reaction is allowed to exotherm and is held at the peak temperature for 15 minutes. Then the mixture is cooled to 57° C. The last addition of the monomer mixture is 573.6 grams and the last t-butyl hydroperoxide solution addition is 0.70 grams. Then 1025 grams water are used to rinse the emonomer emulsion container. Three minutes after the exotherm peak temperature, 0.18 grams of t-butyl hydroperoxide solution and 0.12 grams sodium sulfoxylate formaldehyde dissolved in 7.46 grams of water are added to the reaction mixture followed by an one hour holding at the peak temperature. The emulsion is then cooled to 53° C. The polymer solids content is 28.9%.

To the above emulsion is then added 5.33 grams of 25% sodium lauryl sulfate solution and 15 grams of water. Another 20 grams of water is used to rinse the container. After this mixture is stirred for 15 minutes, 149.3 grams of methyl methacrylate and 0.58 grams of n-dodecyl mercaptan are charged to the reaction flask followed by 100 grams of a water rinse of the monomer container. Then 0.22 of sodium sulfoxylate formaldehyde dissolved in 20 grams of water and 0.22 grams of sodium persulfate dissolved in 120 grams of water are added. After the exotherm peak temperature, the residual monomer is further reacted by adding 0.08 grams of sodium sulfoxylate formaldehyde in 20 grams of water and 0.08 grams of sodium persulfate in 20 grams of water. One hour after this addition, the solid content is found to be 29.9%. The latex particle size is 76 nm. This is Latex A-1 in Example 3.

2. Microagglomeration

In a 5000 ml four neck round bottom flask, which is equipped with a stirrer, a thermometer and a condenser, 3000 grams small particle size impact modifier latex obtained in the above described procedure are heated to 90° C. The agglomerating agents are concentrated ammonia (29.3% by weight) and acetic acid (50% by weight) used as two separate solutions. To the stirred emulsion at 90° C., ammonia and acetic acid solutions are added alternately in 1.19 ml and 2.14 ml increments every 5 minutes. The latex particle size is measured after each addition. The agglomeration process is stopped when the desired particle size is achieved (usually 200–250 nm). The agglomerated latex is then cooled to 53° C.

3. Encapsulation by Methyl Methacrylate

Under nitrogen sweep, 7.14 grams 28% sodium lauryl sulfate solution, 100 grams of methyl methacrylate and 0.4 grams of n-dodecyl mercaptan are added to the above agglomerated emulsion. 214 grams water is used to rinse the containers for the added materials. After the mixture is stirred for 10 minutes, 0.15 grams sodium sulfoxylate formaldehyde dissolved in 10 grams water and 0.15 grams sodium persulfate dissolved in 10 grams water are added to the reaction mixture. After an exotherm is observed, the residual monomer is further reacted by addition of 0.05 grams of sodium sulfoxylate formaldehyde which is dissolved in 4 grams of water and 0.05 grams sodium persulfate which is dissolved in 4 grams of water. The final emulsion is held at 55° C. for 1 hour and then cooled to room temperature.

4. Coagulation of the Microagglomerated Acrylic Impact Modifier

In a 4000 ml beaker, 2000 grams 0.475% calcium chloride solution is heated to 85° C. Under agitation, 1000 grams of the above encapsulated emulsion is slowly poured into the calcium chloride solution. The mixture is allowed to be stirred for 15 minutes and then filtered to remove water. The wet coagulum is washed with 1500 grams water and filtered to remove water. The coagulated polymer is dried in a fluid bed dryer at 80° C.

EXAMPLE 2

Microagglomerated Viscosity Reducing Additive

Small Particle Size Acrylic Viscosity Reducing Additive

In a 5-liter round bottom flask, 1179 grams deionized water was heated to 55° C. with nitrogen sparge. At 55° C., the nitrogen sparge is changed to a constant sweep. Then the following solutions are added to the flask: 17.52 grams of a 0.125 weight % sodium p-nitrosophenolate solution with 7.47 grams deionized rinse water, 15.22 grams of 1.44 weight % tartaric acid solution with 3.46 grams rinse water and 32.29 grams of 28 weight % sodium lauryl sulfate solution with 29.5 grams of rinse water. A separate emulsified monomer mixture is prepared containing 280.7 grams water, 6.82 grams 28% sodium lauryl sulfate solution, 1087.4 grams n-butyl acrylate and 10.87 grams n-dodecyl mercaptan. This emulsified monomer mixture is polymerized in 4 separate shots. The first shot contains 153.7 grams of this monomer emulsion mixture. After it is added to the flask, 0.20 grams 70% t-butyl hydroperoxide and 1.1 grams sodium sulfoxylate formaldehyde dissolved in 17.35 grams of water are immediately added to the flask. Five grams of water are used to rinse the container for sodium sulfoxylate formaldehyde and 104 grams of water is used to rinse the container for the monomer emulsion. After the exotherm has brought the mixture to peak temperature, the reaction mixture is held at this peak temperature for 15 minutes and then cooled to 53° C. The second shot of monomer emulsion, 127.45 grams, is now added into the flask followed by another addition of 0.15 grams of the 70% t-butyl hydroperoxide solution. After the exotherm, the mixture is held at the peak temperature for 15 minutes and then cooled to 53° C. The third charge of monomer emulsion is 573.6 grams of the total monomer mixture. The third addition of the initiator is 0.70 grams of the 70% t-butyl hydroperoxide. The reaction is allowed to exotherm and is held at the peak temperature for 15 minutes. Then the mixture is cooled to 57° C. The last addition of the monomer mixture is 573.6 grams and the last t-butyl hydroperoxide solution addition is 0.70 grams. Then 1025 grams water are used to rinse the monomer emulsion container. Three minutes after the exotherm peak temperature, 0.18 grams of t-butyl hydroperoxide solution and 0.12 grams sodium sulfoxylate formaldehyde dissolved in 7.46 grams of water are added to the reaction mixture, followed by a one hour hold at the peak temperature. The emulsion is then cooled to 53° C. The polymer solids content is 28.9%.

To the above emulsion is added 5.33 grams of 25% sodium lauryl sulfate solution and 15 grams of water. Another 20 grams of water is used to rinse the container. After this mixture is stirred for 15 minutes, 274 grams of methyl methacrylate and 2.74 grams of n-dodecyl mercaptan are charged to the reaction flask followed by a 100 grams water rinse of the monomer container. Then 0.421 grams of sodium sulfoxylate formaldehyde dissolved in 20 grams of water and 0.41 grams of sodium persulfate dissolved in 120 grams of water are added. After the exotherm peak temperature, the residual monomer is further reacted by adding 0.14 grams of sodium sulfoxylate formaldehyde in 20 grams of water and 0.14 grams of sodium persulfate in 20 grams of water. One hour after this addition, the solid content is found to be 32%. This is latex B-1 in Example 3.

Microagglomeration

In a 1000 ml four neck round bottom flask, which is equipped with a stirrer, a thermometer and a condenser, 750 grams small particle size viscosity reducing additive latex obtained in the above described procedure are heated to 90° C. The agglomerating agents are concentrated ammonia (29.3% by weight) and acetic acid (50% by weight) used as two separate solutions. To the 90° C. stirred emulsion, ammonia and acetic acid solutions are added alternately in 0.30 ml and 0.54 ml increment every 5 minutes. The latex particle size is measured after each addition. The agglomeration process is stopped when the desired particle size is achieved (usually 200-250 nm). The agglomerated latex is mixed with 8.03 grams 28% sodium lauryl sulfate solution and then cooled to 53° C.

Encapsulation by Methyl Methacrylate

Under nitrogen sweep, 1.79 grams 28% sodium lauryl sulfate solution, 25 grams of methyl methacrylate and 0.1 grams of n-dodecyl mercaptan are added to the above agglomerated emulsion. 54 grams water is used to rinse the containers for the added materials. After the mixture is stirred for 10 minutes, 0.0375 grams sodium sulfoxylate formaldehyde dissolved in 10 grams water and 0.0375 grams sodium persulfate dissolved in 10 grams water are added to the reaction mixture. After an exotherm is observed, the residual monomer is further reacted by addition of 0.012 grams sodium sulfoxylate formaldehyde which is dissolved in 4 grams of water and 0.012 grams sodium persulfate which is dissolved in 4 grams of water. The final emulsion is held at 55° C. for 1 hour and then cooled to room temperature.

Coagulation of the Microagglomerated Viscosity Reducing Additive

In a 4000 ml beaker, 1667 grams 0.475% calcium chloride solution is heated to 85° C. Under agitation, 833 grams of the above encapsulated emulsion is slowly poured into the calcium chloride solution. The mixture is stirred for 15 minutes and then filtered to remove water. The wet coagulum is washed with 1250 grams water and filtered to remove water. The coagulated polymer is dried in a fluid bed dryer at 80° C. This is Polymer B in the following examples.

EXAMPLE 3

Co-microagglomerated Acrylic Impact modifier and Viscosity Reducing Additive

This example presents the co-microagglomeration of the two core/intermediate shell latices followed by encapsulation with a final shell.

Small Particle Size Acrylic Impact Modifier

Same as the small particle size acrylic impact modifier in example A. (Latex A-1)

Small Particle Size Viscosity Reducing Additive

Same as the small particle size viscosity reducing additive in Example B. (Latex B-1)

Co-microagglomeration

In a 5000 ml four neck round bottom flask, which is equipped with a stirrer, a thermometer and a condenser, 2000 grams small particle size impact modifier latex A-1 obtained by the procedure described in Example 1 and 2000 grams small particle size viscosity reducing additive latex B-1 prepared by the procedure described in Example 2 are heated to 90° C. The agglomerating agents are concentrated ammonia (29.3% by weight) and acetic acid (50% by weight) used as two separate solutions. To the 90° C. stirred emulsion, ammonia and acetic acid solutions are added alternately in 1.58 ml and 2.86 ml increments every 5 minutes. The latex particle size is measured after each addition. The agglomeration process is stopped when the desired particle size (263 nm) is achieved. The agglomerated latex is mixed with 42.9 grams of 28% sodium lauryl sulfate solution, then cooled to 53° C.

Encapsulation by Methyl Methacrylate

Under nitrogen sweep, 9.05 grams 28% sodium lauryl sulfate solution, 126.7 grams of methyl methacrylate and 0.51 grams of n-dodecyl mercaptan are added to the above agglomerated emulsion. 275 grams water is used to rinse the containers for the added materials. After the mixture is stirred for 10 minutes, 0.19 grams sodium sulfoxylate formaldehyde dissolved in 12 grams water and 0.19 grams sodium persulfate dissolved in 12 grams of water are added to the reaction mixture. After an exotherm is observed, the residual monomer is further reacted by addition of 0.06 grams sodium sulfoxylate formaldehyde which is dissolved in 4 grams of water and 0.06 grams sodium persulfate which is dissolved in 4 grams of water. The final emulsion is held at 55° C. for 1 hour and then cooled to room temperature.

Coagulation of the co-microagglomerated Acrylic Impact Modifier and Viscosity Reducing Additive In a 4000 ml breaker, 2000 grams 0.475% calcium chloride solution is heated to 99° C. Under agitation, 1000 grams of the above encapsulated emulsion is slowly poured into the calcium chloride solution. The mixture is stirred for 15 minutes and then filtered to remove water. The wet coagulum is washed with 1500 grams water and filtered to remove water. The coagulated polymer is dried in a fluid bed dryer at 80° C. This is Polymer C in the following text.

EXAMPLE 4

Microagglomerated Encapsulated Viscosity Reducing Additive

This example presents a core/shell polymer with a crosslinked intermediate stage, and the microagglomeration/encapsulation in the absence of an impact modifier.

Small Particle Size Acrylic Impact Modifier

In a 5-liter round bottom flask, 1179 grams deionized water was heated to 55° C. with nitrogen sparge. At 55° C., the nitrogen sparge is changed to a constant sweep. Then the following solutions are added to the flask: 17.52 grams of a 0.125 weight % sodium p-nitrosophenolate solution with 7.47 grams deionized rinse water, 15.22 grams of 1.44 weight % tartaric acid solution with 3.46 grams rinse water and 32.29 grams of 28 weight % sodium lauryl sulfate solution with 29.5 grams of rinse water. A separated emulsified monomer mixture is prepared containing 172.2 grams water, 4.18 grams 28% sodium lauryl sulfate solution, 664.6 grams n-butyl acrylate and 6.66 grams n-dodecyl mercaptan. This emulsified monomer mixture is polymerized in 3 separate shots. The first shot contains 153.7 grams of this monomer emulsion mixture. After it is added to the flask, 0.230 grams 70% t-butyl hydroperoxide and 1.1 grams sodium sulfoxylate formaldehyde dissolved in 17.35 grams of water are immediately added to the flask. Five grams of water are used to rinse the container for sodium sulfoxylate formaldehyde and 104 grams of water is used to rinse the container for the monomer emulsion. After the exotherm has reached its peak temperature, the reaction mixture is held at this peak temperature for 15 minutes and then cooled to 53° C. The second shot of monomer emulsion, 122.98 grams, is now added into the flask followed by another addition of 0.15 grams of the 70% t-butyl hydroperoxide solution. After the exotherm, the mixture is held at the peak temperature for 15 minutes and then cooled to 53° F. The third charge of monomer emulsion is 571.5 grams of the total monomer mixture. The third addition of the initiator is 0.70 grams of the 70% t-butyl hydroperoxide. The reaction is allowed to exotherm and is held at the peak temperature for 15 minutes. Then the mixture is cooled to 57° C. A second monomer emulsion mixture is prepared containing 108 grams of water, 2.64 grams of 28% sodium lauryl sulfate, 418.43 grams of n-butyl acrylate and 2.93 grams of allyl methacrylate. This mixture is added to the reaction flask together with 0.70 grams 70% t-butyl hydroperoxide solutions. Then 1025 grams water is used to rinse the monomer emulsion container. Three minutes after the exotherm peak temperature, 0.18 grams of t-butyl hydroperoxide solution and 0.12 grams sodium sulfoxylate formaldehyde dissolved in 7.46 grams of water are added to the reaction mixture followed by an one hour holding at the peak temperature. The emulsion is then cooled to 53° C. The polymer solids content is 29%.

To the above emulsion are added 5.53 grams of 25% sodium lauryl sulfate solution and 15 grams of water. Another 20 grams of water is used to rinse the container. After this mixture is stirred for 15 minutes, 149.32 grams of methyl methacrylate and 0.58 grams of n-dodecyl mercaptan are charged to the reaction flask followed by a 100 grams water rinse of the monomer container. Then 0.22 grams of sodium sulfoxylate formaldehyde dissolved in 20 grams of water and 0.22 grams of sodium persulfate dissolved in 120 grams of water are added. After the exotherm peak temperature, the residual monomer is further reacted by adding 0.08 grams of sodium sulfoxylate formaldehyde in 20 grams of water and 0.08 grams of sodium persulfate in 20 grams of water. One hour after this addition, the solid content is found to be 30%. This is latex D-1.

Microagglomeration

In a 1000 ml four neck round bottom flask, which is equipped with a stirrer, a thermometer and a condenser, 750 grams small particle size encapsulated viscosity reducing additive latex obtained in the above described procedure are heated to 90° C. The agglomerating agents are concentrated ammonia (29.3% by weight) and acetic acid (50% by weight) used as two separate solutions. To the 90° C. stirred emulsion, ammonia and acetic acid solutions are added alternately in 0.30 ml and 0.54 ml increment every 5 minutes. The latex particle size is measured after each addition. The agglomeration process is stopped when the desired particle size is achieved (usually 200-250 nm). The agglomerated latex is mixed with 8.03 grams 28% sodium lauryl sulfate solution and then cooled to 53° C.

Encapsulation by Methyl Methacrylate

Under nitrogen sweep, 1.79 grams 28% sodium lauryl sulfate solution, 25 grams of methyl methacrylate and 0.1 grams of n-dodecyl mercaptan are added to the above agglomerated emulsion. Water (54 grams) is used to rinse the containers for the added materials. After the mixture is stirred for 10 minutes, 0.0375 grams sodium sulfoxylate formaldehyde dissolved in 10 grams water and 0.0375 grams sodium persulfate dissolved in 10 grams water are added to the reaction mixture. After an exotherm is observed, the residual monomer is further reacted by addition of 0.012 grams sodium sulfoxylate formaldehyde which is dissolved in 4 grams of water and 0.012 grams sodium persulfate which is dissolved in 4 grams of water. The final emulsion is held at 55° C. for 1 hour and then cooled to room temperature.

Coagulation of the Microagglomerated Encapsulated Viscosity Reducing Additive In a 4000 ml beaker, 1667 grams 0.475% calcium chloride solution is heated to 70° C. Under agitation, 833 grams of the above encapsulated emulsion is slowly poured into the calcium chloride solution. The mixture is allowed to be stirred for 15 minutes and then filtered to remove water. The wet coagulum is washed with 1250 grams and filtered to remove water. The coagulated polymer is dried in a fluid bed dryer at 80° C. This is Polymer D.

EXAMPLE 5

Co-microagglomerated Acrylic Impact modifier and Encapsulated Viscosity Reducing Additive

Small Particle Size Acrylic Impact Modifier

Same as the small particle size acrylic impact modifier in example 1. (Latex A-1)

Small Particle Size Encapsulated Viscosity Reducing Additive

Same as the small particle size encapsulated viscosity reducing additive in Example 4. (Latex D-1).

Co-microagglomeration

In a 1000 ml four neck round bottom flask, which is equipped with a stirrer, a thermometer and a condenser, 375 grams small particle size impact modifier latex obtained by the procedure described in Example 1 and 375 grams small particle size encapsulated viscosity reducing additive latex D-1 prepared by the procedure in Example 4 are heated to 90° C. The agglomerating agents are concentrated ammonia (29.3% by weight) and acetic acid (50% by weight) used as two separate solutions. To the 90° C. stirred emulsion, ammonia and acetic acid solutions are added alternately in 0.30 ml and 0.54 ml increment every 5 minutes. The latex particle size is measured after each addition. The agglomeration process is stopped when the desired particle size (250 nm) is achieved. The agglomerated latex is mixed with 8.92 grams 28% sodium lauryl sulfate solution then cooled to 53° C.

Encapsulation by Methyl Methacrylate

Under nitrogen sweep, 1.78 grams 28% sodium lauryl sulfate solution, 25 grams of methyl methacrylate and 0.1 grams of n-dodecyl mercaptan are added to the above agglomerated emulsion. 69 grams water is used to rinse the containers for the added materials. After the mixture is stirred for 10 minutes, 0.0375 grams sodium sulfoxylate formaldehyde dissolved in 10 grams water and 0.0375 grams sodium persulfate dissolved in 10 grams water are added to the reaction mixture. After an exotherm is observed, the residual monomer is further reacted by addition of 0.013 grams sodium sulfoxylate formaldehyde which is dissolved in 4 grams of water and 0.013 grams sodium persulfate which is dissolved in 4 grams of water. The final emulsion is held at 55° C. for 1 hour and then cooled to room temperature.

Coagulation of the co-microagglomerated Acrylic Impact Modifier and Viscosity Reducing Additive In a 4000 ml beaker, 1667 grams 0.475% calcium chloride solution is heated to 70° C. Under agitation, 833 grams of the above encapsulated emulsion is slowly poured into the calcium chloride solution. The mixture is allowed to be stirred for 15 minutes and then filtered to remove water. The wet coagulum is washed with 1250 grams water and filtered to remove water. The coagulated polymer is dried in a fluid bed dryer at 80° C. This is Polymer E Testing Results:

1). PVC Fusion.

The test is made on a Haake System 90 torque rheometer. The mixing chamber is heated to 170° C. The rotating speed of the mixing paddles is set at 50 rpm. The microagglomerated additives are mixed with a preblended poly(vinyl chloride) master batch according to the following formulations. The mixed powder is then charged into the heated mixing chamber. The torque and temperature changes are recorded. The speed of gelation or fusion is characterized by the Time to Peak Torque and the Temperature of the mixture at that time (Peak Temperature). Excessively long fusion times are less desirable.

| Poly(vinyl chloride) Master Batch | K58 PVC | 100 |
| | Organotin Stabilizer | 2.0 |
| | Glycerol monostrearate | 0.5 |
| | Oxidized polyethylene wax | 0.2 |
| | Microagglomerated additive(s) | 0, 7 or 14 |

| A Impact modifier only | B Viscosity reducing additive only | C Coaggl. and encaps. A-1//B-1//shell 45//45//10 | Time to Peak Torque (seconds) | Peak Temperature (°C.) |
| --- | --- | --- | --- | --- |
| 0 | 0 | 0 | 47 | 163 |
| 0 | 7 | 0 | 264 | 178 |
| 7 | 7 | 0 | 218 | 176 |
| 0 | 0 | 14 | 161 | 175 |

| A Impact modifier only | D Viscosity reducing additive only | E Coaggl. and encaps. A-1//D-1//shell 45//45//10 | Time To Peak Torque (seconds) | Peak Temperature (°C.) |
| --- | --- | --- | --- | --- |
| 0 | 0 | 0 | 47 | 163 |
| 0 | 10 | 0 | 259 | 178 |
| 10 | 10 | 0 | 188 | 176 |
| 0 | 0 | 20 | 165 | 176 |

Example: Powder Compaction Properties

A major advantage to coagglomerating the small particle size acrylic impact modifiers and flow improving processing acids is that it facilitates isolation of the flow improving additives, which tend to compact. The data from a Hosokawa powder compaction test illustrate this advantage. The testing was done on 52 ml of powder placed in a stainless steel cup, covered and loaded on top with a lead weight of 964.2 g. The cup and weight were placed in an automatic tapping device and tapped for 180 seconds. The cover and weight were then removed from the cup and the cup contents were carefully pressed out using the false bottom of the cup onto a screen with 2 mm openings (No. 10 screen). The screen was then vibrated for 60 seconds using a rheostat dial setting of 4.5. The weight of any polymer remaining on the screen following the 60 seconds of vibration was recorded. The weight of remaining polymer was divided by the total weight of polymer used to obtain the fraction of polymer remaining on the screen, which is reported in the table below. Two measurements were done for each sample. It is seen the co-microagglomerated materials pass more completely through the screen.

| Sample | Fraction of Polymer Remaining On Screen | | |
|---|---|---|---|
| | Run 1 | Run 2 | Average |
| B: Microagglomerated Viscosity Reducing Additive | 0.987 | 0.981 | 0.984 |
| C: Co-microagglomerated Acrylic Impact Modifier and Viscosity Reducing Additive | 0.327 | 0.323 | 0.325 |
| D: Microagglomerated Multistage Flow Improving Additive | 0.624 | 0.690 | 0.657 |
| E: Co-microagglomerated Acrylic Impact Modifier and Multistage Flow Improving Additive | 0.246 | 0.333 | 0.289 |

Example: Impact Measurements on PVC Milled/Molded Plaques

Co-microagglomeration of the acrylic impact modifiers and flow improving additives does not reduce the effectiveness of the impact modification provided to the PVC by the additives compared with a simple physical blend of the additives. This is illustrated by the notched Izod impact measurements made on milled and molded PVC plaques described in this example.

Blending of PVC Formulation

A PVC masterbatch was prepared by blending the PVC resin, heat stabilizer, and lubricants specified in the table below in a 5-lb high intensity mixer. The blending procedure involved mixing the PVC resin alone in the high-intensity mixer until it shear heated to 52° C. The liquid organo-tin stabilizer was then added to the blend. The blend was allowed to shear heat to 66° C. and the lubricants were added to the blend. High intensity mixing was continued with the addition of steam to the mixer jacket until the blend temperature reached 95° C. The blend was then cooled with only slow stirring to 60° C. by circulating water through the mixer jacket. The blend, which will be referred to as the PVC masterbatch, was removed from the mixer at approximately 60° C. The individual blends containing the microagglomerated additives were prepared by hand mixing the amounts of PVC masterbatch and microagglomerated additives specified in the table below.

| PVC Mill/Molding Masterbatch Formulation |
|---|
| 100.0 phr PVC (K = 60) Resin |
| 2.0 phr dimethyltin bis(2-ethylhexylthioglycolate) |
| 2.7 phr glycerol monostearate |
| 0.3 phr polyolefin wax - external lubricant |
| 1.0 phr high Mw poly(MMA/EA) copolymer |
| 8.0 phr core/shell BA//MMA copolymer |
| 1.5 phr TiO$_2$ |
| 0, 4 or 8 phr Flow Improving Additive |

| Blend | PVC Masterbatch | Microagglomerated Additives |
|---|---|---|
| 1 | 105.0 phr | None |
| 2 | 105.0 phr | 7 phr A: Small particle size acrylic impact modifier + 7 phr B: Microagglomerated flow improving additive |
| 3 | 105.0 phr | 14 phr C: Co-microagglomerated acrylic impact modifier and flow improving additive |
| 4 | 105.0 phr | 10 phr A: Small particle size acrylic impact modifier + 10 phr D: Microagglomerated multistage flow improving additive |
| 5 | 105.0 phr | 20 phr E: Co-microagglomerated acrylic impact modifier and multistage flow improving additive |

Milling and Molding PVC Plaques

The PVC powder blends were milled on a two-roll mill heated to 177° C. for five minutes. The fused sheet was removed from the mill and pressed in a metal picture frame mold to form a 14 cm×24.1 cm×0.32 cm plaque. The molding was done in a 177° C. press by heating the mold for three minutes under light pressure, applying a 70 ton pressure for two minutes, and then transferring the mold to a cold press to cool for five minutes.

Notched Izod Impact Measurements

Izod bars were cut from the molded plaques and notched in accordance with ASTM Standard D256. The samples were tested at 23° C. and 18° C. Impact measurements were made on five bars for each blend. The results for Izod bars cut with their long direction in the machine direction of the plaques are shown in the tables below.

| Notched Izod Impact Measurements at 23° C. | | | | |
|---|---|---|---|---|
| | Notched Izod Impact Strength (J/m) | | | |
| | Hinge Breaks | | Clean Breaks | |
| Blend | Impact Strength | Number of Samples | Impact Strength | Number of Samples |
| 1: PVC Masterbatch | — | 0 | 32 J/m | 5 |
| 2: PVC Masterbatch + 7 phr A + 7 phr B | 544 J/m | 3 | 11 | 2 |
| 3: PVC Masterbatch + 14 phr C | 523 | 4 | 11 | 1 |
| 4: PVC Masterbatch + 10 phr A + 10 phr D | 918 | 4 | 21 | 1 |
| 5: PVC Masterbatch + 20 phr E | 902 | 5 | — | 0 |

| Notched Izod Impact Measurements at 18° C. | | | | |
|---|---|---|---|---|
| | Notched Izod Impact Strength (J/m) | | | |
| | Hinge Breaks | | Clean Breaks | |
| Blend | Impact Strength | Number of Samples | Impact Strength | Number of Samples |
| 1: PVC Masterbatch | — | 0 | 32 J/m | 5 |
| 2: PVC Masterbatch + 7 phr A + 7 phr B | — | 0 | 75 | 5 |
| 3: PVC Masterbatch + | — | 0 | 75 | 5 |

-continued

Notched Izod Impact Measurements at 18° C.

| | Notched Izod Impact Strength (J/m) | | | |
|---|---|---|---|---|
| | Hinge Breaks | | Clean Breaks | |
| Blend | Impact Strength | Number of Samples | Impact Strength | Number of Samples |
| 14 phr C | | | | |
| 4: PVC Masterbatch + 10 phr A + 10 phr D | 897 J/m | 5 | — | 0 |
| 5: PVC Masterbatch + 20 phr E | 865 | 5 | — | 0 |

Example: Spiral Flow Measurements

Co-microagglomeration of the acrylic impact modifiers and flow improving additives does not reduce the flow improvement of the PVC resulting from the additives when compared with a formulation containing a simple physical blend of the additives. This is shown in spiral flow measurements on PVC injection molding formulations made using a spiral mold in an injection molding machine as described below.

Blending

The PVC injection molding formulations were prepared by blending the PVC resin, the heat stabilizer, and the lubricants specified below in a 35-lb Henschel mixer. The blending procedure involved mixing the PVC resin alone in the high-intensity mixer until it shear heated to 52° C. The liquid organo-tin stabilizer was then added to the blend. The blend was allowed to shear heat to 66° C. and the lubricants were added to the blend. High intensity mixing was continued until the blend temperature reached 95° C. The blend was then cooled with only slow stirring to 60° C. by circulating water through the mixer jacket. The blend, which will be referred to as the PVC masterbatch, was removed from the mixer at approximately 60° C.

The blends containing the impact modifiers and processing aids were prepared by mixing the desired amounts of PVC masterbatch and the additives together in a 5-lb high intensity blender at room temperature for five minutes (the blend temperature will exceed room temperature due to shear heating but no additional heat was applied).

| PVC Injection Molding Masterbatch Formulation |
|---|
| 100.0 phr PVC (K = 60) Resin |
| 2.0 phr dimethyltin bis(2-ethylhexylthioglycolate) |
| 2.7 phr glycerol monostearate |
| 0.3 phr polyolefin wax - external lubricant |
| 1.0 phr high Mw poly(MMA/EA) copolymer |
| 8.0 phr core/shell BA//MMA copolymer |
| 1.5 phr TiO$_2$ |
| 0, 4 or 8 phr Flow Improving Additive |

| Blend | PVC Masterbatch | Impact Modifiers and Processing Aids |
|---|---|---|
| 1 | 105.0 phr | 1.0 phr HMW-PA |
| 2 | 105.0 phr | 1.0 phr HMW-PA + 8.0 phr A: Small particle size acrylic impact modifier + 8.0 phr B: Microagglomerated flow improving additive |
| 3 | 105.0 phr | 1.0 phr HMW-PA + 16.0 phr C: Co-microagglomerated acrylic impact modifier and flow improving additive |

Extruding and Pelletizing

The blends were extruded using an American Leistritz counter-rotating twin-screw extruder and pelletized. The extruder is equipped with 34 mm counter-rotating screws. There are five barrel sections giving a total length to diameter ratio of 15.9. The barrel temperatures were set at 140°/145°/150°/155° C. (Note: no heat to first barrel) and the die temperature was set at 160° C. The blends were extruded into a single strand through a 3.2 mm diameter die and cooled by passing through a water bath before being chopped into pellets.

Injection Molding

The spiral flow molding was done using a spiral shape Master Unit Die insert in an Arburg 270-90-350 injection molding machine. The injection molding machine had a 22 mm diameter screw with a length to diameter ratio of 20.5 and a compression ratio of 2.1. The barrel temperatures were set at 146°, 171°, and 177° C. and the nozzle temperature was set at 186° C. The screw speed was set at 200 rpm. These settings produced a melt temperature of approximately 210° C. as measured for an air shot using a hand-held pyrometer with a needle probe. The mold temperature was 32° C. Spirals were injection molded for three different injection pressures: 495 bar, 720 bar, and 1590 bar.

Spiral Flow Measurements

The spiral flow lengths obtained for the three different injection pressures are shown in the table below for Blends 1, 2, and 3. The values in the table represent the averages and the standard deviations (in parentheses) for five spiral length measurements. The measurements indicate that the flow of the PVC masterbatch (Blend 1) is improved when the flow improving additive is present and that the flow of the PVC blend in which the impact modifier is co-microagglomerated with the flow improving additive (Blend 3) is equivalent to the blend in which the microagglomerated impact modifier and the microagglomerated flow improving additive are blended in separately (Blend 2).

| | Spiral Flow Measurements | | |
|---|---|---|---|
| | Spiral Flow Length (cm) for Injetion Pressure P | | |
| Blend | P = 495 bar | P = 720 bar | P = 1590 bar |
| 1 | 9.4 (±0.6) | 18.7 (±0.1) | 51.9 (±0.2) |
| 2 | 11.5 (±0.1) | 20.5 (±0.4) | 52.5 (±0.2) |
| 3 | 12.2 (±0.1) | 21.1 (±0.0) | 52.9 (±0.4) |

We claim:

1. An agglomerated, encapsulated blend of a core/shell impact modifier and a core/shell processing aid which comprises:
   a. an impact modifier component comprising particles of:
      1) a rubbery core polymer particle having a glass temperature below about −20° C. and a particle size below about 100 nm diameter, the rubbery core polymer particle containing at least 50 weight percent of units derived from butadiene, $C_2$ to $C_8$ alkyl esters of acrylic acid, or mixtures thereof, and having a weight-average molecular weight of at least about 500,000; and
      2) an intermediate shell polymer encapsulating the rubbery core polymer, the intermediate shell polymer having a glass temperature above −20° C., the intermediate shell containing predominately units derived from $C_1$ to $C_4$ esters of acrylic or methacrylic acid, and the intermediate shell being from about 5% to about 20% by weight of the rubbery core/intermediate shell polymer particles;
b. a processing aid component comprising particles of:
1) a core polymer particle having a particle size below about 100 nm diameter, the core polymer particle containing from at least 80 weight percent of units derived from $C_4$ to $C_{12}$ alkyl esters of acrylic acid or methacrylic acid or mixtures thereof and from 0 to about 20 parts of units derived from at least one other vinyl or vinylidene monomer, and having a weight-average molecular weight of no more than about 100,000, the core polymer not containing units derived from a graftlinking or crosslinking monomer, and the core polymer not being deliberately crosslinked; and at least one of:
2) an intermediate crosslinked shell polymer encapsulating the core polymer particle, and containing
a) at least about 90 weight percent of units derived from one or more of vinyl aromatic monomers or $C_1$–$C_4$ alkyl esters of (meth)acrylic acid,
b) from about 0.5 to about 10 weight percent of units derived from at least one of:
i) a multifunctional monomer containing two or more copolymerizable double bonds; or
ii) an alkali, alkaline earth, or transition metal salt of a copolymerizable unsaturated acid; or
3) an intermediate shell stage of a polymer encapsulating the core polymer particle and, if present, the intermediate cross-linked shell polymer, and containing at least about 70 weight percent of units derived from one or more of vinyl aromatic monomers or $C_1$ to $C_4$ alkyl esters of methacrylic acid; and
c. a final external encapsulating shell of hard polymer having a glass temperature at least 60° C., the encapsulating shell containing predominately units derived from a $C_1$ to $C_4$ alkyl ester of methacrylic acid, the encapsulating shell comprising from about 5 to about 20% by weight of the final core/shell polymer blend, the encapsulating shell encapsulating an agglomerate of impact modifier and processing aid particles, the encapsulating shell forming a particle of at least 150 nm diameter.

2. The blend of claim 1 wherein at least one of the encapsulating shells of the final external shell of the agglomerated, encapsulated blend; the impact modifier intermediate shell polymer or the processing aid, non-crosslinking, intermediate, shell polymer comprises a majority of units derived from methyl methacrylate.

3. The blend of claim 1 wherein the rubbery impact modifier core polymer contains predominantly units derived from n-butyl acrylate.

4. The blend of claim 1 wherein the rubbery impact modifier core polymer further contains units derived from at least one multiunsaturated monomer.

5. The blend of claim 4 wherein the units derived from at least one multiunsaturated monomer are derived from at least one of allyl methacrylate, allyl acrylate, diallyl maleate, diallyl fumarate divinylbenzene, a di- or triacrylate ester of a polyol, or a di- or trimethacrylate ester of a polyol.

6. The blend of claim 1 wherein the $C_4$ to $C_{12}$ alkyl ester of acrylic acid or methacrylic acid in the processing aid core polymer particle is butyl acrylate.

7. The blend of claim 1 wherein the salt of the copolymerizable unsaturated acid in the processing aid intermediate crosslinked polymer shell comprises at least one salt of methacrylic acid, acrylic acid, itaconic acid, maleic acid, fumaric acid, alpha-methylene-delta-methyladipic acid, or acryloxypropionic acid.

8. The blend of claim 1 wherein the alkali salt is the sodium salt.

9. An agglomerated encapsulated blend of a core-/shell impact modifier and a core/shell processing aid which comprises:
a. a final external impact modifier component comprising particles of:
1) a rubbery core polymer particle having a glass temperature below about −20° C. and a particle size below about 100 nm diameter, the rubbery core polymer particle containing at least 50 weight percent of units derived from butadiene, $C_2$ to $C_8$ alkyl esters of acrylic acid, or mixtures thereof, and having a weight-average molecular weight of at least about 500,000; and
2) an intermediate shell polymer encapsulating the rubbery core polymer, the intermediate shell polymer having a glass temperature above −20° C., the intermediate shell containing predominately units derived from $C_1$ to $C_4$ esters of acrylic or methacrylic acid, and the intermediate shell being from about 5% to about 20% by weight of the rubbery core/intermediate shell polymer particles;
b. a processing aid component comprising particles of:
1) a core polymer particle having a particle size below about 100 nm diameter, the core polymer particle containing from at least 80 weight percent of units derived from $C_4$ to $C_{12}$ alkyl esters of acrylic acid or methacrylic acid or mixtures thereof and from 0 to about 20 parts of units derived from at least one other vinyl or vinylidene monomer, and having a weight-average molecular weight of no more than about 100,000, the core polymer not containing units derived from a graftlinking or crosslinking monomer, and the core polymer not being deliberately crosslinked;
2) an intermediate crosslinked shell polymer encapsulating the core polymer particle, and containing
a) at least about 90 weight percent of units derived from one or more of vinyl aromatic monomers or $C_1$–$C_4$ alkyl esters of (meth)acrylic acid,
b) from about 0.5 to about 10 weight percent of units derived from an alkali metal salt of a copolymerizable unsaturated acid; and
c. a final external encapsulating shell of hard polymer having a glass temperature at least 60° C., the encapsulating shell containing predominately units derived from a $C_1$ to $C_4$ alkyl ester of methacrylic acid, the encapsulating shell comprising from about 5 to about 20% by weight of the final core/shell polymer blend, the encapsulating shell encapsulating an agglomerate of impact modifier and processing aid particles, the encapsulating shell forming a particle of at least 150 nm diameter.

10. The blend of claim 9 wherein at least one of the shells of the final core/shell polymer blend or of the intermediate shell polymers comprises a majority of units derived from methyl methacrylate, wherein the rubbery core polymer particle contains predominately units derived from n-butyl acrylate, and wherein the rubbery core polymer further contains units derived from at least one multiunsaturated monomer selected from at least one of allyl methacrylate, allyl acrylate, diallyl maleate, diallyl fumarate, divinylbenzene, a di- or triacrylate ester of a polyol, or a di- or trimethacrylate ester of a polyol.

11. The blend of claim 9 wherein the salt of the copolymerizable unsaturated acid is selected from at least one salt of methacrylic acid, acrylic acid, itaconic acid, maleic acid, fumaric acid, alpha-methylene-delta-methyladipic acid, or acryloxypropionic acid, and wherein the alkali salt is the sodium salt.

12. The blend of claims 1 or 9 wherein the final external encapsulating shell forms a particle of from about 150 nm to about 263 nm in diameter.

* * * * *